July 23, 1957     W. P. SAGE     2,799,953
LABEL
Filed Jan. 25, 1954
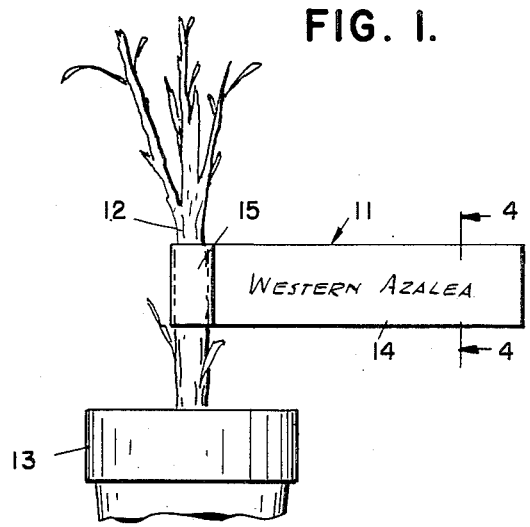
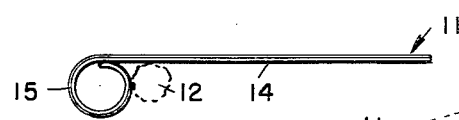
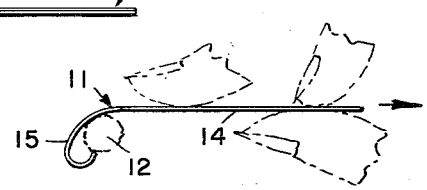
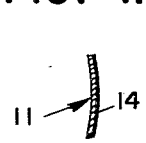
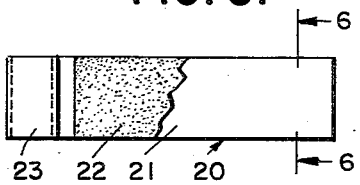
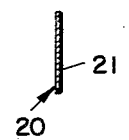
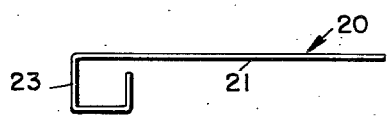
INVENTOR
WALTER P. SAGE
BY
*Mason & Graham*
ATTORNEYS 2,799,953
Patented July 23, 1957

2,799,953

LABEL

Walter P. Sage, Los Angeles, Calif., assignor of one-third to John W. Thies, Los Angeles, Calif.

Application January 25, 1954, Serial No. 405,997

3 Claims. (Cl. 40—11)

This invention has to do with labels, particularly those suitable for attachment to plant stems or similar objects.

An object of the invention is to provide a simple label or tag which can be readily attached to the stem of a plant or a similar object.

Another object is to provide a one-piece label which is so constructed that it can be quickly snapped onto and quickly removed from an object, the means for attachment being inherently a part of the label thereby eliminating the necessity of tie strings or other supplemental attachment means.

These and other objects will be apparent from the drawing and the following description.

Referring to the drawing:

Fig. 1 is an elevational view showing a label embodying the invention attached to a plant;

Fig. 2 is an edge view of the label of Fig. 1;

Fig. 3 is a side edge view of the label showing the application thereof to an object;

Fig. 4 is a sectional view on line 4—4 of Fig. 1;

Fig. 5 is a face view of a modified form of the label;

Fig. 6 is a sectional view on line 6—6 of Fig. 5;

Fig. 7 is a side edge view of the label of Fig. 5; and

Fig. 8 is a side edge view of an end of another form of label.

More particularly describing the invention, referring first to Figs. 1–4, 11 generally indicates a label embodying the invention which, in Fig. 1, is shown attached to the stem 12 of a plant in a flower pot 13. While my label is particularly designed for use in identifying plants and is so shown and described, it will be apparent that it may be used for many other purposes and can readily be attached to a variety of objects.

The label comprises a body made of a springy sheet material which is weather resistant. Several types of plastics are suitable for this purpose including a relatively stiff but springy form of Vinylite. An example is Vinylite VU 5300 White 08, having a thickness of about .010″, sold by Union Carbide & Carbon Company. The label includes a main portion 14 which should have at least one surface thereof of sufficient roughness that it can readily be written upon with pencil or crayon. To lend stiffness to the main body, it may be formed to have a slight curvature as shown in Fig. 4, however, this is not essential.

At one end or one marginal edge portion I provide a springy end section 15 which is shown as convolute in Figs. 1–4, the material of the label being bent back upon itself in circular shape. As shown most clearly in Figure 2 the curved end section 15 is preferably bent to encompass an arc of approximately 360° and with the end edge lying substantially against and tangentially to the uncurved portion of the strip. Any substantial departure from either of these particularities of the configuration shown in Figure 2 seriously interferes with the facility of use of the label.

In the use of the label the convolute end section 15 can be readily snapped onto or removed from a plant stem 12 or other object. To attach the label, it is only necessary to place the label so that the stem lies in the region indicated in broken lines in Fig. 2 and then pull the label as a whole against the stem as shown in Fig. 3, thereby causing the convolute end section 15 to open up and admit the stem which it then encompasses when the label is released. The label can also be quickly removed merely by pulling it off the stem. If the end section encompasses an arc appreciably greater than 360° it is difficult to snap onto a stem which has a tendency to collapse rather than intrude into the confines of the convolute section. On the other hand, if the encompassed arc is appreciably less than 360° then the label is limited to use on stems at least approximating the diameter of the convolute section.

While I have shown a circular or convolute end portion 15, it is not essential that the end section be circular but merely that it be so formed as to be capable of substantially encircling or encompassing an object to which the label is to be attached. Thus by way of example, in Figs. 5–7 I show a label 20 consisting of metal having spring quality including a main portion 21 with a satin finish 22 thereon to facilitate the application of indicia thereto by a lead pencil or the like. At its end the main portion 21 terminates in an end portion 23 which is bent to form a shape which is substantially rectangular in cross section as viewed from the side edge of the label. This form of the invention operates and is used in the same way as the form previously described.

It will be apparent that the end portion of the label which surrounds the object to which the label is attached may be made in various shapes, and, by way of example, in Fig. 8 I show a label 26 having an end portion which includes a circular section 27 terminating in a diverging section 28. The latter facilitates applying the label to an object.

While I have shown and described preferred forms of my invention, I contemplate that various changes and modifications can be made without departing from the scope of the invention such as indicated by the claims. For example, it is not essential that the entire label have the quality of springiness, since this is only required of the end portion which is applied to an object to which the label is attached.

I claim:

1. A unitary label for attachment to a stem-like member and to extend perpendicularly therefrom comprising a thin elongate strip of flexible material, one end of the strip being bent back upon itself to encompass an arc of approximately 360° and with the end edge lying substantially against the face of the unturned portion of the strip.

2. A unitary label for attachment to a plant stem or similar rod-like member and to extend perpendicularly therefrom comprising a thin elongate flexible plastic strip, one end of the strip being bent back on itself in a smooth curve through an arc of approximately 360° and with the end extremity lying substantially against and tangentially to the uncurved portion of the strip.

3. A unitary label for attachment to a plant stem or similar rod-like member and to extend perpendicularly therefrom comprising a thin elongate flexible plastic strip, one end of the strip being bent back on itself in a smooth curve through an arc of approximately 360° and on a radius at least approximately equal to the radius of said stem with the end extremity lying substantially against and tangentially to the uncurved portion of the strip, the uncurved portion of the strip being slightly arcuate about its longitudinal axis.

References Cited in the file of this patent

UNITED STATES PATENTS

| | | |
|---|---|---|
| 1,970,697 | Hammitt | Aug. 21, 1934 |
| 2,556,825 | Smith | June 12, 1951 |
| 2,625,760 | Cleal | Jan. 20, 1953 |
| 2,642,684 | Watts | June 23, 1953 |

FOREIGN PATENTS

| | | |
|---|---|---|
| 21,361 | Great Britain | Sept. 17, 1897 |
| 223,182 | Switzerland | Nov. 16, 1942 |